United States Patent
Burnett

[11] 3,779,456
[45] Dec. 18, 1973

[54] MEASURING ATTACHMENT FOR MOTOR VEHICLE WHEELS

[76] Inventor: William W. Burnett, Rt. 1, Box 1275, Lincoln, Calif. 95648

[22] Filed: Mar. 14, 1973

[21] Appl. No.: 341,088

[52] U.S. Cl. ............. 235/95, 235/95 B, 235/95 C
[51] Int. Cl. .................................................. G01c
[58] Field of Search ............ 235/95 B, 95 C, 95 R, 235/96, 103, 105, 146; 248/75, 231; 287/59

[56] References Cited
UNITED STATES PATENTS
3,174,365   3/1965   Lucarelli ............................ 248/231
1,903,695   4/1933   Chobert ............................... 287/59

FOREIGN PATENTS OR APPLICATIONS
548,169   4/1932   Germany ............................ 235/95 C Primary Examiner—Richard B. Wilkinson
Assistant Examiner—Pat Salce
Attorney—Alexander B. Blair et al.

[57] ABSTRACT

A measuring attachment for motor vehicle wheels which includes a revolution counter and a flexible clamp to clamp the counter to the rotating hub of a motor vehicle wheel. The counter shaft is rigidly secured to the clamp and the counter body is weighted with a pendulum weight to prevent its rotation as the shaft is rotated with the vehicle wheel. A reset knob is provided for resetting the counter when desired.

3 Claims, 4 Drawing Figures

3,779,456

3,779,456

MEASURING ATTACHMENT FOR MOTOR VEHICLE WHEELS

BACKGROUND OF THE INVENTION

1. Field of the Invention

The present invention relates to counters for counting the revolutions of a vehicle wheel.

2. Summary of the Invention

A vehicle wheel revolution counter consists of a flexible clamp rigidly secured to the hub of the vehicle to rotate therewith and secured rigidly to the shaft of a counter. The counter body is provided with a pendulum weight suspended therefrom to prevent rotation of the counter as its shaft is rotated by the clamp. A reset knob is provided for resetting the counter to zero when desired.

The primary object of the invention is to provide a counter for counting the revolutions of a motor vehicle wheel so as to measure the distance covered by the motor vehicle.

Other objects and advantages will become apparent in the following specification when considered in the light of the attached drawings.

DESCRIPTION OF THE PREFERRED EMBODIMENT

Figure 1:
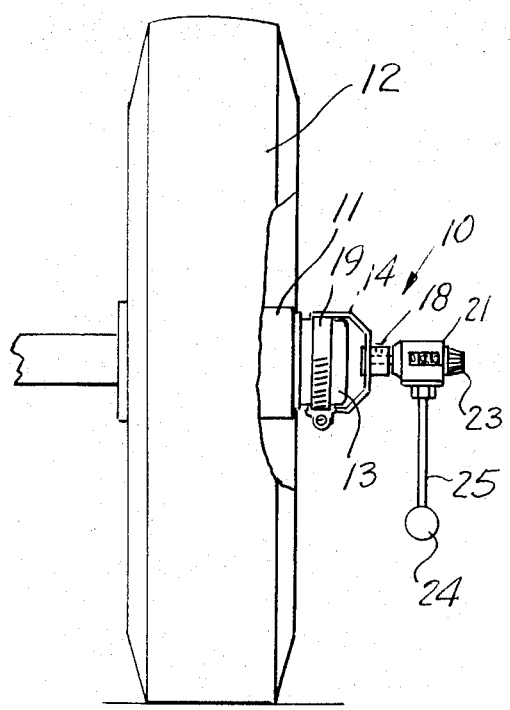
FIG. 1 is an elevational view of the invention, shown attached to a motor vehicle wheel hub partially broken away for convenience of illustration.
Figure 2:
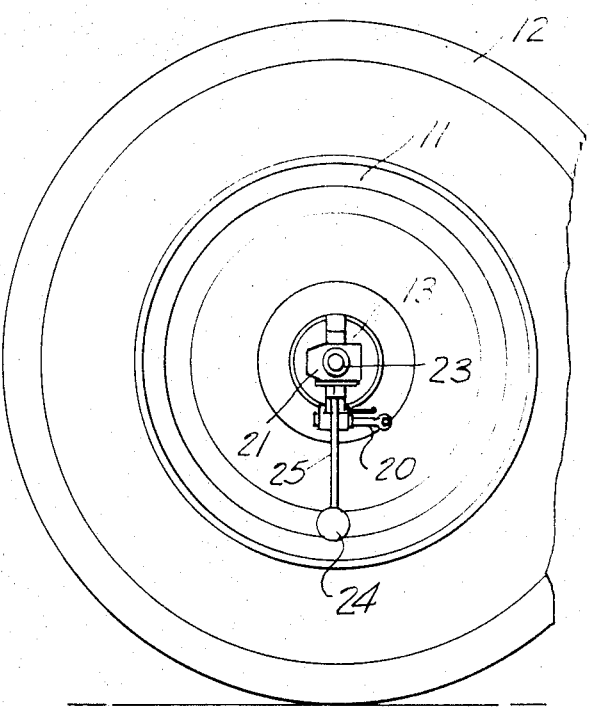
FIG. 2 is a side elevation of the invention attached to the motor vehicle hub.
Figure 3:
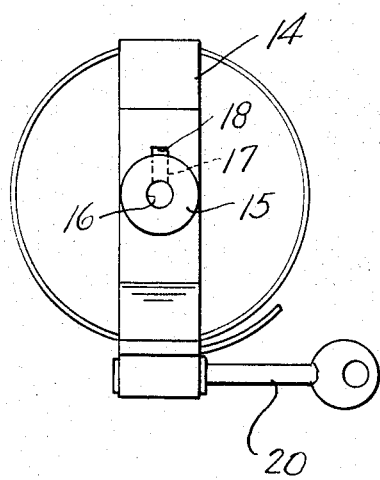
FIG. 3 is a side elevation of the clamp with the counter removed.
Figure 4:
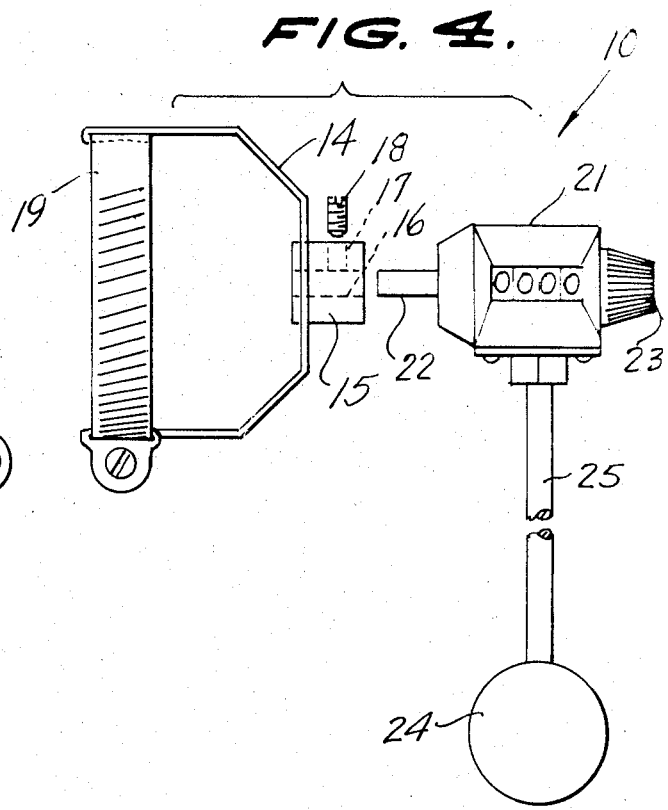
FIG. 4 is an exploded elevational view of the invention.

Referring now to the drawings in detail, wherein like reference characters indicate like parts throughout the several figures, the reference numeral 10 indicates generally a motor vehicle wheel revolution counter apparatus constructed in accordance with the invention.

The apparatus 10 is adapted for use with a motor vehicle wheel 11 having a tire 12 mounted thereon. The wheel 11 has a hub 13 associated therewith in axially aligned relation.

The apparatus 10 includes a generally U-shaped yoke 14 having a bushing 15 secured centrally thereon. The bushing 15 has an axial bore 16 extending therethrough intersected by a threaded bore 17 adapted to receive a set-screw 18.

The yoke 14 has its outer end secured to a flexible circular clamp 19 provided with a hand key 20 for tightening and loosening the clamp 19.

A conventional revolution counter 21 has a shaft 22 extending therefrom which is mounted in the bore 16 and rigidly secured therein by the set-screw 18. A knob 23 on the counter 21 permits the counter 21 to be reset as desired.

A pendulum weight 24 is mounted on the lower end of the shaft 25 having its upper end secured to the counter 21. The weight of the shaft 24 is sufficient to prevent the rotation of the counter 21 as its shaft 22 is rotated.

In the use and operation of the invention the band 19 is positioned to encompass the hub 13 and the key 20 is tightened so as to rigidly secure the yoke 14 to the hub 13. The shaft 22 is inserted in the bore 16 and the set-screw 18 is tightened thereagainst to rigidly secure the shaft 22 to the bushing 15. The vehicle is then moved over the area to be measured and each revolution of the wheel 11 will be counted as one by the counter 21. In order to arrive at an accurate measurement of the distance traversed by the wheel 11 the outer circumference of the tire 12 is measured and multipled by the count of revolutions shown on the counter 21.

Having thus described the preferred embodiment of the invention it should be understood that numerous structural modifications and adaptations may be resorted to without departing from the spirit of the invention.

What is claimed is:

1. A revolution counting apparatus comprising a flexible clamp for detachable connection to a wheel hub, a revolution counter including a shaft, a weight depending from said counter and means connecting said shaft and said clamp to rotate said shaft upon rotation of said clamp.

2. A device as claimed in claim 1 wherein the means connecting said clamp and said shaft includes a generally U-shaped yoke having its opposite ends connected to said clamp and a bushing rigidly connected to said yoke and detachably connected to said shaft.

3. A device as claimed in claim 1 wherein a hand actuated key is mounted on said clamp for tightening and loosening said clamp on said hub.

* * * * *